(12) United States Patent
Kim et al.

(10) Patent No.: US 9,379,377 B2
(45) Date of Patent: Jun. 28, 2016

(54) CATHODE FOR LITHIUM SECONDARY BATTERY AND LITHIUM SECONDARY BATTERY COMPRISING THE SAME

(71) Applicant: LG Chem, Ltd., Seoul (KR)

(72) Inventors: Jong-Hee Kim, Daejeon (KR); Hyung-Kyu Lim, Daejeon (KR); In-Jung Kim, Daejeon (KR); In-Seok Yang, Gyeonggi-do (KR); Seok-Jung Park, Seoul (KR)

(73) Assignee: LG Chem, Ltd. (KR)

( * ) Notice: Subject to any disclaimer, the term of this patent is extended or adjusted under 35 U.S.C. 154(b) by 45 days.

(21) Appl. No.: 13/852,362

(22) Filed: Mar. 28, 2013

(65) Prior Publication Data

US 2013/0209865 A1    Aug. 15, 2013

Related U.S. Application Data

(63) Continuation of application No. PCT/KR2011/007291, filed on Sep. 30, 2011.

(30) Foreign Application Priority Data

Sep. 30, 2010  (KR) .......................... 10-2010-0095376
Sep. 30, 2011  (KR) .......................... 10-2011-0100234

(51) Int. Cl.
*H01M 4/131* (2010.01)
*H01M 4/64* (2006.01)
(Continued)

(52) U.S. Cl.
CPC .............. *H01M 4/131* (2013.01); *H01M 4/136* (2013.01); *H01M 4/366* (2013.01);
(Continued)

(58) Field of Classification Search
CPC ....... H01M 4/64; H01M 4/131; H01M 4/366; H01M 4/5825
USPC .................................................. 429/163, 211
See application file for complete search history.

(56) References Cited

U.S. PATENT DOCUMENTS 8,084,159 B2    12/2011   Park et al.
2010/0297497 A1  11/2010   Takahata
(Continued)

FOREIGN PATENT DOCUMENTS

CN    101635350 A    1/2010
CN    101728514 A    6/2010
(Continued)

OTHER PUBLICATIONS

International Search Report dated Apr. 23, 2012 for Application No. PCT/KR2011/007291.
(Continued)

*Primary Examiner* — Karie O'Neill Apicella
(74) *Attorney, Agent, or Firm* — Lerner, David, Littenberg, Krumholz & Mentlik, LLP

(57) ABSTRACT

Disclosed is a cathode for a lithium secondary battery and a lithium secondary battery comprising the same. The cathode may include a current collector, a first composite layer formed from a mixture of olivine-type lithium iron phosphate cathode active material powder and a binder on the current collector, and a second composite layer formed from a mixture of olivine-type lithium iron phosphate cathode active material powder and a binder on the first composite layer. A specific surface area of the olivine-type lithium iron phosphate cathode active material powder in the second composite layer may be at least 1.2 times larger than that of the olivine-type lithium iron phosphate cathode active material powder in the first composite layer. The cathode for a lithium secondary battery has excellent safety, high energy density, and high output performance.

8 Claims, 1 Drawing Sheet

(51) Int. Cl.
  *H01M 4/36*    (2006.01)
  *H01M 4/58*    (2010.01)
  *H01M 4/136*   (2010.01)
  H01M 4/62     (2006.01)
  H01M 10/0525  (2010.01)

(52) U.S. Cl.
  CPC ............. *H01M 4/5825* (2013.01); *H01M 4/64* (2013.01); *H01M 4/625* (2013.01); *H01M 4/626* (2013.01); *H01M 10/0525* (2013.01); *Y02E 60/122* (2013.01)

(56) References Cited

U.S. PATENT DOCUMENTS

2011/0020703 A1* 1/2011 Suzuki et al. ................. 429/221
2011/0027651 A1  2/2011 Sun et al.

FOREIGN PATENT DOCUMENTS

| | | | | |
|---|---|---|---|---|
| JP | 2001-110414 | A | 4/2001 | |
| JP | 2006210003 | A | 8/2006 | |
| JP | 2008243529 | A | 10/2008 | |
| JP | 2008293875 | A * | 12/2008 | ............. H01M 4/02 |
| JP | 2009-026599 | A | 2/2009 | |
| JP | 2009026599 | A * | 2/2009 | ............. H01M 4/02 |
| JP | 2009245827 | A | 10/2009 | |
| KR | 2008-0049157 | A | 6/2008 | |
| KR | 20080068593 | A | 7/2008 | |
| KR | 20090102138 | A | 9/2009 | |
| KR | 20100103850 | A | 9/2010 | |
| WO | 2008091074 | A1 | 7/2008 | |

OTHER PUBLICATIONS

Supplemental European Search Report for Application No. 11829638 dated Nov. 20, 2015.

* cited by examiner

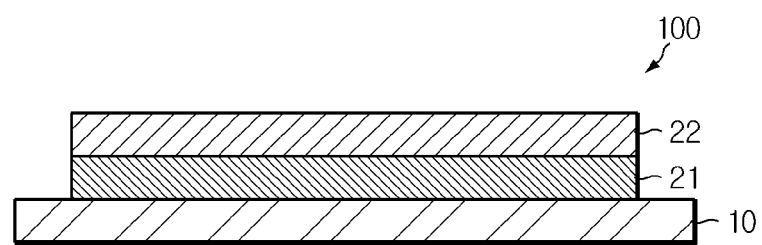

US 9,379,377 B2

CATHODE FOR LITHIUM SECONDARY BATTERY AND LITHIUM SECONDARY BATTERY COMPRISING THE SAME

CROSS-REFERENCE TO RELATED APPLICATION

This application is a continuation of International Application PCT/KR2011/007291 filed on Sep. 30, 2011, which claims the benefit under 35 U.S.C. 119(a) of Korean Patent Application No. 10-2010-0095376, filed on Sep. 30, 2010 and Korean Patent Application No. 10-2011-0100234 filed on Sep. 30, 2011, the entire disclosure of which is incorporated herein by reference for all purposes.

BACKGROUND

1. Field

The present invention relates to a cathode for a lithium secondary battery and a lithium secondary battery comprising the same. More particularly, the present invention relates to a cathode for a lithium ion polymer battery that uses olivine-type lithium iron phosphate as a cathode active material and that has high energy density, and a lithium secondary battery comprising the same.

2. Description of Related Art

Recently, there is an increasing interest in energy storage technologies. As the application fields of energy storage technologies have been extended to mobile phones, camcorders, notebook computers, and even electric cars, the demand for high energy density of batteries used as power sources of electronic equipment has been increasing. Lithium secondary batteries are given attention as the most favorable battery capable of meeting the demand, and currently studies are being actively made on lithium secondary batteries.

Lithium secondary batteries developed in the early 1990's are made up of an anode of a carbon-based material capable of intercalating and deintercalating lithium ions, a cathode of lithium containing oxide, and a non-aqueous electrolyte containing a proper amount of lithium salts dissolved in a mixed organic solvent.

As a cathode active material of a lithium secondary battery, lithium cobalt oxide ($LiCoO_2$), lithium nickel oxide ($LiNiO_2$), or lithium composite metal oxide (Li(Ni—Co—Al)$O_2$, Li(Ni—Co—Mn)$O_2$) is used. Among them, lithium cobalt oxide has a layered crystal structure of O3, which makes it easy to intercalate and deintercalate lithium ions, and thus, is currently used in a majority of lithium secondary batteries.

However, studies have been made to develop new cathode active materials since cobalt, a raw material of lithium cobalt oxide is a costly heavy metal that is not environmental friendly. As alternative cathode active materials, spinel-type lithium manganese oxide ($LiMn_2O_4$) and an olivine-type lithium iron phosphate compound ($LiFePO_4$) that are low in cost and have high stability have been suggested.

Of them, olivine-type lithium iron phosphate has a very stable structure. Also, olivine-type lithium iron phosphate is excellent in thermal stability because phosphate-based materials are used as a flame retardant. Accordingly, olivine-type lithium iron phosphate is qualified as a cathode active material capable of meeting the high stability demand of lithium secondary batteries that has been increasingly emphasized recently.

However, when the solid content of olivine-type lithium iron phosphate is 80 wt. % or more, a cathode active material slurry has an excessively high viscosity that is awkward to convey through a pipe and to coat a current collect, which makes it difficult to manufacture a cathode. Conversely, when the solid content of olivine-type lithium iron phosphate is less than 80 wt. %, it will be a chief obstacle in meeting the rising demand for high energy density batteries.

DISCLOSURE

Technical Problem

Accordingly, it is an object of the invention to provide a cathode for a lithium secondary battery that is based on olivine-type lithium iron phosphate having excellent stability and that can achieve high energy density and high output performance, and a lithium secondary battery comprising the same.

Technical Solution

In order to achieve the object, provided is a cathode for a lithium secondary battery including a current collector, a first composite layer formed from a mixture of olivine-type lithium iron phosphate cathode active material powder and a binder on the current collector, and a second composite layer formed from a mixture of olivine-type lithium iron phosphate cathode active material powder and a binder on the first composite layer, wherein a specific surface area of the olivine-type lithium iron phosphate cathode active material powder in the second composite layer is at least 1.2 times larger than that of the olivine-type lithium iron phosphate cathode active material powder in the first composite layer.

Preferably, the specific surface area of the olivine-type lithium iron phosphate cathode active material powder in the second composite layer may be 1.2 to 2.0 times larger than that of the olivine-type lithium iron phosphate cathode active material powder in the first composite layer.

In the present invention, an average particle size of the active material particles in the first composite layer may be larger than that of the active material particles in the second composite layer.

In the present invention, the particles of the olivine-type lithium iron phosphate cathode active material powder may be coated with a carbon-based material, metal or metalloid, or oxide of the metal or metalloid.

The cathode of the present invention has excellent safety, high energy density, and improved cycle life characteristics, and thus may be usefully employed as a cathode for a lithium secondary battery.

DESCRIPTION OF DRAWINGS

The accompanying drawing illustrates a preferred embodiment of the present disclosure and together with the foregoing closure, serves to provide further understanding of the technical spirit of the present disclosure. However, the present disclosure is not construed as being limited to the drawing.

FIG. 1 is a schematic cross-sectional view illustrating a cathode for a lithium secondary battery according to the present invention.

DETAILED DESCRIPTION

The present invention will now be described in detail. It should be understood that terms and words used in the specification and the appended claims should not be construed as having common and dictionary meanings, but should be interpreted as having meanings and concepts corresponding to technical ideas of the present invention in view of the principle that the inventor can properly define the concepts of the terms and words in order to describe his/her own invention as best as possible.

FIG. 1 is a schematic cross-sectional view illustrating a cathode 100 for a lithium secondary battery according to an exemplary embodiment of the present invention. The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art.

The cathode 100 for a lithium secondary battery according to the present invention includes a current collector 10, a first composite layer 21 formed from a mixture of olivine-type lithium iron phosphate cathode active material powder and a binder on the current collector 10, and a second composite layer 22 formed from a mixture of olivine-type lithium iron phosphate cathode active material powder and a binder on the first composite layer 21, that are stacked on top of each other in a sequential fashion. The cathode 100 is characterized in that a specific surface area of the olivine-type lithium iron phosphate cathode active material powder in the second composite layer 22 is at least 1.2 times larger than that of the olivine-type lithium iron phosphate cathode active material powder in the first composite layer 21.

As described above, 80 wt. % or more (solid content) of olivine-type lithium iron phosphate is not favorable in preparing a cathode slurry for a cathode composite layer including olivine-type lithium iron phosphate. Accordingly, a cathode slurry needs to include less than 80 wt. % (solid content) of olivine-type lithium iron phosphate, and to improve the energy density with such a cathode slurry, increasing the thickness of a coating layer may be contemplated. However, an increase in thickness of a cathode composite layer may cause cracking due to gas from a solvent evaporated during drying.

To solve this problem, the inventors suggest forming a double-layered cathode composite layer. That is, a cathode active material slurry may be coated and dried, followed by solvent evaporation, to form a first composite layer, and the cathode active material slurry may be then coated thereon and dried to form a second composite layer, thereby reducing or preventing the likelihood that the composite layer may be cracked during solvent evaporation.

In the cathode composite layer of the present invention, a specific surface area of the olivine-type lithium iron phosphate powder in the second composite layer 22 may be at least 1.2 times larger than that of the olivine-type lithium iron phosphate powder in the first composite layer 21. The repeated coating of a cathode active material slurry may reduce the interfacial adhesive strength between a plurality of composite layers. However, the inventor discovered that the interfacial adhesive strength may be maintained at a good level when the olivine-type lithium iron phosphate cathode active materials of the layers have a difference in specific surface area by 20% or more.

In the cathode composite layer of the present invention, when the specific surface area of the second composite layer 22 contacting a separator is at least 1.2 times larger than that of the first composite layer 21 contacting the current collector 10, an amount of lithium ions capable of simultaneous reaction during charging/discharging may increase, which is effective in achieving high output.

The specific surface area of the active material in the second composite layer 22 relative to the first composite layer 21 may vary depending on the required specification of batteries, and may be, for example, 1.2 to 2.0 times, preferably 1.2 to 1.8 times, more preferably 1.25 to 1.5 times.

Also, the active material particles of the first composite layer 21 may have an average particle size larger than that of the active material particles of the second composite layer 22.

When there is a difference in average particle size between cathode active material powder of different cathode composite layers as described above, particles having a smaller average particle size may be inserted into particles having a larger average particle size to some extent at the interface between the composite layers, which is advantageous in improving the adhesive strength. For example, the average particle size of one composite layer 21 contacting the current collector 10 may be larger by 20% or more than that of the other composite layer 22, however the present invention is not limited in this regard.

In the present invention, a load amount of each cathode active material of the first and second composite layers 21 and 22 may be properly selected within the range of the present invention. For example, the load amount of the first composite layer 21 may be 5 to 25 mg/cm$^2$ and the load amount of the second composite layer 22 may be 5 to 25 mg/cm$^2$, however the present invention is not limited in this regard. The load amount of the first and second composite layers 21 and 22 may be equal or different.

In the cathode composite layer of the present invention, the first composite layer 21 may have a thickness of 10 to 150 μm, and the second composite layer 21 may have a thickness of 10 to 150 μm. When the thickness of the first and second composite layers is within the above range, output characteristics may be improved.

The cathode 100 of the present invention may be manufactured by coating the current collector 10 with a cathode active material slurry including a cathode active material, a binder, and an organic solvent, followed by drying, to form a cathode composite layer.

As described above, the cathode active material used in the present invention is olivine-type lithium iron phosphate, and the olivine-type lithium iron phosphate particles may be optionally coated with coating materials known in the art, such as carbon-based materials, metals or metalloids, or oxides of the metals or metalloids. This coating may improve the conductivity of the active material particles or prevent side reactions of an electrolyte solvent at the surface of the active material. The carbon-based materials usable as a coating material may include soft carbon, hard carbon, natural graphite, artificial graphite, Kish graphite, pyrolytic carbon, mesophase pitch based carbon fiber, meso-carbon microbeads, mesophase pitches, petroleum derived cokes, and tar pitch derived cokes. The metals or metalloids may include Si, Ti, and Al. However, the present invention is not limited in this regard.

The binder used in the present invention may include polyvinylidenefluoride-hexafluoropropylene copolymer (PVDF-co-HFP), polyvinylidenefluoride, polyacrylonitrile, and polymethylmethacrylate, however the present invention is not limited in this regard.

The organic solvent used in the present invention is not particularly limited, but may include typical ones used in the art, for example, N-methylpyrrolidone.

Optionally, the cathode active material slurry of the present invention may further include a conductive material. The conductive material may include conductive carbon, for example, graphite, carbon black, acetylene black, Ketjen black, Super-P, or carbon nano tube, however the present invention is not limited in this regard.

The cathode for a lithium secondary battery according to the present invention may be used in lithium secondary batteries fabricated such that an electrode assembly comprising a cathode, an anode, and a separator interposed therebetween may be placed in a battery casing and a non-aqueous electrolyte may be injected in the battery casing. The anode, the separator, and the non-aqueous electrolyte constituting the electrode assembly together with the cathode of the present invention are not particularly limited, and may include all typical ones used in the art to fabricate lithium secondary batteries.

Similar to the cathode, the anode of the present invention may be manufactured by mixing and agitating an anode active material, a binder and a solvent, and optionally a conductive material and a dispersant to prepare a slurry that is coated on a current collector, followed by drying.

As the cathode active material, carbon-based materials capable of intercalating and deintercalating lithium ions, lithium metals, silicon, or tin may be generally used. Also, metal oxides having a potential of less than 2V based on Li, for example, $TiO_2$ or $SnO_2$, may be mentioned. Among them, carbon-based materials are preferred, for example, low crystallinity carbon or high crystallinity carbon. Typically, low crystallinity carbon includes soft carbon and hard carbon, and high crystallinity carbon includes high temperature sintered carbon such as natural graphite, Kish graphite, pyrolytic carbon, mesophase pitch based carbon fiber, meso-carbon microbeads, mesophase pitches, petroleum derived cokes, and tar pitch derived cokes.

The binder, the solvent, and the conductive material for the anode may include the above materials used for the cathode.

The separator may include, but is not limited to, a single-layered or multi-layered porous polymer film and a porous non-woven fabric, conventionally used as a separator. The porous polymer film may be made from polyolefin-based polymer, for example, ethylene homopolymer, propylene homopolymer, ethylene/butene copolymer, ethylene/hexene copolymer, and ethylene/methacrylate copolymer, and the porous non-woven fabric may be made from, for example, high-melting glass fibers or polyethylene terephthalate fibers. However, the present invention is not limited in this regard.

In the electrolyte used in the present invention, a lithium salt usable as an electrolyte (solute) is not particularly limited if it is conventionally used in an electrolyte for lithium secondary batteries. For example, an anion of the lithium salt may be any one selected from the group consisting of $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$.

Also, an organic solvent contained in the electrolyte is not particularly limited if it is conventionally used in an electrolyte for lithium secondary batteries. For example, the organic solvent may be any one selected from the group consisting of propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethylsulfoxide, acetonitrile, dimethoxyethane, diethoxyethane, vinylene carbonate, sulforane, γ-buryrolactone, propylene sulfite, and tetrahydrofuran, or mixtures thereof. In particular, among the above carbonate-based organic solvents, cyclic carbonate, that is, ethylene carbonate and propylene carbonate are preferred since they have high viscosity and consequently a high dielectric constant, and thus can easily dissociate the lithium salt in the electrolyte. More preferably, when linear carbonate having low viscosity and a low dielectric constant, such as dimethyl carbonate and diethyl carbonate, is mixed with the cyclic carbonate at a suitable ratio, the mixture contributes to a high electric conductivity of an electrolyte.

Optionally, the electrolyte stored according to the present invention may further include an additive such as an overcharge inhibitor that is conventionally used in an electrolyte.

The battery casing used in the present invention may be any one conventionally used in the art, and the appearance of the battery casing is not limited to a specific shape based on the purpose of use of the battery. For example, the battery casing may have a cylindrical shape, a prismatic shape, a pouch shape, or a coin shape.

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

Example 1

<Manufacture of Cathode>

$LiFePO_4$ having a specific surface area of 14 $m^2/g$ as a cathode active material, polyvinylidene fluoride (PVdF) as a binder, and carbon black as a conductive material were mixed at a weight ratio of 89:6:5, and then dispersed in N-methyl-2-pyrrolidone, to prepare a first cathode slurry.

A second cathode slurry was prepared in the same way as the first cathode slurry, except that $LiFePO_4$ having a specific surface area of 21 $m^2/g$ was used as a cathode active material.

The first slurry was coated on an aluminum current collector to form a first composite layer (a load amount: 8 $mg/cm^2$), and the second slurry was coated thereon to form a second composite layer (a load amount: 8 $m^2/cm^2$), followed by drying and rolling, to manufacture a cathode. The first composite layer had a thickness of 35 μm, and the second composite layer had a thickness of 35 μm.

<Fabrication of Battery>

Artificial graphite as an anode active material, styrene-butadiene rubber as a binder, and carboxymethyl cellulose as a thickening agent were mixed at a weight ratio of 96.8:2.2:1, and then dispersed in water, to prepare an anode slurry that was coated on a copper current collector, followed by drying and rolling, to manufacture an anode.

A non-aqueous electrolyte was prepared by dissolving 1M of $LiPF_6$ in a mixed solution of ethylene carbonate:ethyl methyl carbonate:dimethyl carbonate at a volume ratio of 3:3:4.

Next, the cathode and the anode were placed with a PE separator interposed therebetween, and the electrolyte was injected, to fabricate a medium-large scale polymer battery.

Comparative Example 1

<Manufacture of Cathode>

$LiFePO_4$ having a specific surface area of 14 $m^2/g$ as a cathode active material, polyvinylidene fluoride (PVdF) as a binder, and carbon black as a conductive material were mixed at a weight ratio of 89:6:5, and then dispersed in N-methyl-2-pyrrolidone, to prepare a cathode slurry.

The cathode slurry was coated on an aluminum current collector to form a composite layer (a load amount: 12 $mg/cm^2$), followed by drying and rolling, to manufacture a cathode. The composite layer had a thickness of 80 μm.

<Fabrication of Battery>

Artificial graphite as an anode active material, styrene-butadiene rubber as a binder, and carboxymethyl cellulose a thickening agent were mixed at a weight ratio of 96.8:2.2:1, and then dispersed in water, to prepare an anode slurry that was coated on a copper current collector, followed by drying and rolling, to manufacture an anode.

A non-aqueous electrolyte was prepared by dissolving 1M of $LiPF_6$ in a mixed solution of ethylene carbonate:ethyl methyl carbonate:diethyl carbonate at a volume ratio of 3:3:4.

Next, the cathode and the anode were placed with a PE separator interposed therebetween, and the electrolyte was injected, to fabricate a medium-large scale polymer battery.

According to teachings above, the cathode for a lithium secondary battery according to the present invention has high safety by using olivine-type lithium iron phosphate as a cathode active material.

Also, the cathode of the present invention is made up of a plurality of composite layers, and thus may achieve high energy density, and has different specific surface areas of a plurality of the composite layers, thereby improving the adhesive strength between the composite layer and the current collector and between the composite layers.

Also, the cathode of the present invention has an active material layer having a relatively larger specific surface area around the periphery thereof, and thus may increase an amount of lithium ions capable of simultaneous reaction, which is useful in achieving high output.

What is claimed is:

1. A cathode for a lithium secondary battery, comprising:
   a current collector;
   a first composite layer formed from a mixture of olivine-type lithium iron phosphate cathode active material particles and a binder on the current collector; and
   a second composite layer formed from a mixture of olivine-type lithium iron phosphate cathode active material particles and a binder on the first composite layer,
   wherein a specific surface area of the olivine-type lithium iron phosphate cathode active material particles in the second composite layer is 1.5 to 2.0 times larger than that of the olivine-type lithium iron phosphate cathode active material particles in the first composite layer,
   wherein a load amount of the cathode active material particles in the first composite layer is equal to that of the cathode active material particles in the second composite layer,
   wherein the load amount of the cathode active material particles in the first composite layer is 5 to 25 $mg/cm^2$, and
   wherein the load amount of the cathode active material particles in the second composite layer is 5 to 25 $mg/cm^2$.

2. The cathode for a lithium secondary battery according to claim 1,
   wherein an average particle size of the cathode active material particles in the first composite layer is larger than that of the active material particles in the second composite layer.

3. The cathode for a lithium secondary battery according to claim 1,
   wherein the first composite layer has a thickness of 10 to 150 μm.

4. The cathode for a lithium secondary battery according to claim 1,
   wherein the second composite layer has a thickness of 10 to 150 μm.

5. The cathode for a lithium secondary battery according to claim 1,
   wherein the active material particles are coated with a material selected from the group consisting of a carbon-based material, metal, metalloid, oxide of the metal and oxide of the metalloid.

6. The cathode for a lithium secondary battery according to claim 5,
   wherein the carbon-based material is any one selected from the group consisting of soft carbon, hard carbon, natural graphite, artificial graphite, Kish graphite, pyrolytic carbon, mesophase pitch based carbon fiber, meso-carbon microbeads, mesophase pitches, petroleum derived cokes, tar pitch derived cokes, and mixtures thereof.

7. The cathode for a lithium secondary battery according to claim 5,
   wherein the metal or metalloid is any one selected from the group consisting of Si, Ti, Al, and mixtures thereof, and the oxide of the metal or the oxide of the metalloid is oxide of any one selected from the group consisting of Si, Ti, Al, and mixtures thereof.

8. A lithium secondary battery comprising:
   an electrode assembly including a cathode, an anode, and a separator interposed between the cathode and the anode;
   a battery casing to receive the electrode assembly; and
   a non-aqueous electrolyte injected in the battery casing,
   wherein the cathode is defined in of claim 1.

* * * * *